United States Patent
Zhao

(10) Patent No.: US 12,089,185 B2
(45) Date of Patent: Sep. 10, 2024

(54) RESOURCE ALLOCATION METHOD AND DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 651 days.

(21) Appl. No.: 17/266,998

(22) PCT Filed: May 28, 2019

(86) PCT No.: PCT/CN2019/088856
§ 371 (c)(1),
(2) Date: Feb. 8, 2021

(87) PCT Pub. No.: WO2020/034717
PCT Pub. Date: Feb. 20, 2020

(65) Prior Publication Data
US 2021/0168767 A1   Jun. 3, 2021

(30) Foreign Application Priority Data
Aug. 16, 2018  (CN) .................. 201810936950.3

(51) Int. Cl.
*H04W 72/02* (2009.01)
*H04L 27/26* (2006.01)
(Continued)

(52) U.S. Cl.
CPC ....... *H04W 72/02* (2013.01); *H04L 27/26025* (2021.01); *H04W 72/0453* (2013.01);
(Continued)

(58) Field of Classification Search
None
See application file for complete search history.

(56) References Cited

U.S. PATENT DOCUMENTS

2016/0315809 A1   10/2016  McMurry et al.
2017/0295559 A1*  10/2017  Agiwal ............... H04W 72/23
(Continued)

FOREIGN PATENT DOCUMENTS

CN       1735257 A    2/2006
CN    102291833 A   12/2011
(Continued)

OTHER PUBLICATIONS

Huawei, et al., "Sidelink physical layer structure and procedure for NR V2X", 3GPP TSG RAN WG1 Meeting #94, Gothenburg, Sweden, Aug. 20-24, 2018, total 6 pages, R1-1808093.
(Continued)

*Primary Examiner* — The Hy Nguyen
(74) *Attorney, Agent, or Firm* — Kilpatrick Townsend & Stockton LLP

(57) ABSTRACT

Disclosed in the embodiments of the present application are a resource allocation method and device. When implementing resource allocation, the embodiments of the present application includes: for a logical channel corresponding to any one sidelink communication service, a protocol layer responsible for resource allocation of a sidelink communication interface generates a candidate frequency band resource list corresponding to the logical channel; the protocol layer allocates resources to the logical channel corresponding to the sidelink communication service from the candidate frequency band resource list.

17 Claims, 6 Drawing Sheets

```
┌─────────────────────────────────────────────────────┐        100
│  for a logic channel corresponding to a sidelink    │
│  communication service, generating, by a protocol  │
│  layer responsible for resource allocation of a    │
│  sidelink communication interface, a candidate     │
│  frequency band resource list corresponding to     │
│  the logic channel                                 │
└─────────────────────────────────────────────────────┘
                        │
                        ▼                              101
┌─────────────────────────────────────────────────────┐
│  allocating, by the protocol layer, resources for  │
│  the logic channel corresponding to the sidelink   │
│  communication service from the candidate         │
│  frequency band resource list                      │
└─────────────────────────────────────────────────────┘
```

(51) Int. Cl.
*H04W 72/0453* (2023.01)
*H04W 72/542* (2023.01)
*H04W 72/543* (2023.01)
*H04W 80/02* (2009.01)

(52) U.S. Cl.
CPC ....... *H04W 72/542* (2023.01); *H04W 72/543* (2023.01); *H04W 80/02* (2013.01)

(56) References Cited

U.S. PATENT DOCUMENTS

| 2019/0124015 | A1* | 4/2019 | Loehr | H04L 5/0058 |
| 2020/0053768 | A1* | 2/2020 | Chen | H04W 72/1263 |
| 2021/0168814 | A1* | 6/2021 | Chen | H04W 72/02 |

FOREIGN PATENT DOCUMENTS

| CN | 102474874 | A | 5/2012 |
| CN | 107347215 | A | 11/2017 |
| CN | 107454675 | A | 12/2017 |
| CN | 107872885 | A | 4/2018 |
| CN | 108093485 | A | 5/2018 |
| EP | 3836686 | A1 | 6/2021 |
| KR | 20210042930 | A | 4/2021 |

OTHER PUBLICATIONS

Huawei et al.,"UE autonomous resource selection based on sensing", 3GPP TSG RAN WG2 Meeting #95, Gothenburg, Sweden, Aug. 22-26, 2016, total 5 pages, R2-164878.

Huawei et al.,"Use cases for multiple active bandwidth parts", 3GPP TSG-RAN WG2 NR AH Jul. 2018, Montreal, Canada, Jul. 2-6, 2018, total 2 pages, R2-1810618.

MCC Support, "Final Report of 3GPP TSG RAN WG1 #90 v1.0.0", 3GPP TSG RAN WG1 Meeting #90bis, Prague, Czech Rep, Oct. 9-13, 2017, total 172 pages, R1-1716941.

Zte, "Discussion on carrier selection in PC5 CA", 3GPP TSG-RAN WG2 Meeting #100, Reno, USA, Nov. 27-Dec. 1, 2017, total 6 pages, R2-1713070.

Oppo,"Carrier selection in CA-based eV2x", 3GPP TSG-RAN2 Meeting #101, Athens, Greece, Feb. 26-Mar. 2, 2018, total 4 pages, R2-1801852(revision of R2-1712178).

Zte,"Discussion on LAA occupied channel bandwidth", 3GPP TSG-RAN WG1 Meeting #80, Athens, Greece, Feb. 9-13, 2015, total 6 pages, R1-150157.

* cited by examiner

RESOURCE ALLOCATION METHOD AND DEVICE

The present application is a National Stage of International Application No. PCT/CN2019/088856, filed May 28, 2019, which claims the priority from Chinese Patent Application No. 201810936950.3, filed with the China National Intellectual Property Administration on Aug. 16, 2018 and entitled "Resource Allocation Method and Device", the entire content of which is hereby incorporated by reference.

FIELD

The present application relates to the field of wireless communication technology, and in particular to a resource allocation method and device.

BACKGROUND

With the development of technology, the discussion about future autonomous driving has become more and more heated. In addition to sensors, the Vehicle-To-Everything, V2X, technology is also being developed as a sensing means for autonomous driving. In recent years, the development of the V2X technology has become faster and faster.

The V2X hopes to realize the information interactions between vehicles and all entities that may affect vehicles, for the purpose of reducing accidents, reducing traffic congestion, decreasing environment pollution and providing other information services.

The V2X mainly includes Vehicle-To-Vehicle, V2V, Vehicle-To-Infrastructure, V2I, Vehicle-To-Network, V2N, and Vehicle-To-Pedestrian, V2P.

Here, the V2V can be used for information interaction and reminding between vehicles, and the most typical application thereof is the anti-collision safety system between vehicles. In the V2I, vehicles can communicate with roads and even other infrastructure, e.g., traffic lights, roadblocks, etc., to obtain the road management information such as traffic light signal timing. The V2N is a form of Internet of Vehicles that is most widely used at present, and the main function thereof is to connect vehicles to a cloud server through a mobile network, so that the vehicles can use the navigation, entertainment, and anti-theft functions provided by the cloud server. The V2P is used as the safety warning for pedestrians or non-motorized vehicles on the road.

In the transmission process of V2X services, the communication resources of the sidelink communication interface of the terminal are needed for transmission, but no scheme related to the resource selection of the sidelink communication interface is provided in the current 5G system.

In summary, it is currently necessary to solve the problem of resource allocation of the sidelink communication interface.

SUMMARY

Embodiments of the present application provide a resource allocation method and device, to solve the problem of resource allocation of the sidelink communication interface.

In a first aspect, an embodiment of the present application provide a resource allocation method, the method includes:

for a logic channel corresponding to a sidelink communication service, generating, by a protocol layer responsible for resource allocation of a sidelink communication interface, a candidate frequency band resource list corresponding to the logic channel; and allocating, by the protocol layer, resources for the logic channel corresponding to the sidelink communication service from the candidate frequency band resource list.

The resources are allocated on one or more frequency band resources. In some embodiments, the protocol layer determines the candidate frequency band resource list corresponding to the logic channel according to one or a combination of: a correspondence between logical channels corresponding to the sidelink communication services and Sub-Carrier Spacings, SCSs; a correspondence between frequency band resources and the SCSs; capability information of a sidelink communication terminal; a correspondence, configured by a high layer, between the sidelink communication services and the frequency band resources.

In some embodiments, the protocol layer determines the correspondence between logical channels corresponding to the sidelink communication services and the SCSs based on: Quality of Service (QoS) parameters of logical channels corresponding to the sidelink communication services; or high-level configuration.

In some embodiments, the protocol layer allocates resources for the logic channel corresponding to the sidelink communication service from the candidate frequency band resource list according to: a data volume of the logical channel corresponding to the sidelink communication service.

In some embodiments, the protocol layer allocates resources for the logic channel corresponding to the sidelink communication service from the candidate frequency band resource list according to: a result of measuring, by a sidelink communication terminal, candidate frequency bands in the candidate frequency band resource list.

In some embodiments, the protocol layer allocates resources for the logic channel corresponding to the sidelink communication service from the candidate frequency band resource list according to: a data volume of the logical channel corresponding to the sidelink communication service; and a result of measuring, by a sidelink communication terminal, candidate frequency bands in the candidate frequency band resource list.

In some embodiments, in a resource allocation mode of network scheduling, the protocol layer is a Media Access Control, MAC, layer of a network-side device; or in a resource allocation mode of terminal self-selection, the protocol layer is an MAC layer of the sidelink communication terminal.

In some embodiments, the sidelink communication terminal receives the correspondence between the frequency band resources and the SCSs through broadcast or dedicated signaling; or the sidelink communication terminal obtains the correspondence between the frequency band resources and the SCSs through protocol agreement or pre-configuration.

In some embodiments, in the resource allocation mode of network scheduling, the MAC layer of the network-side device receives the auxiliary information for frequency band resource selection reported by the sidelink communication terminal; the auxiliary information includes one or a combination of: QoS parameters of the logical channels corresponding to the sidelink communication services; a data volume of the logical channel corresponding to the sidelink communication service; the capability information of the sidelink communication terminal; a candidate frequency band resource list suggested by the sidelink communication terminal; a result of measuring, by the sidelink communication terminal, on all frequency band resources or the suggested candidate frequency band resource list.

In some embodiments, in the resource allocation mode of network scheduling, the sidelink communication terminal receives a scheduling signaling for the sidelink communication interface sent by the network-side device; the scheduling signaling carries the indication information of one or more frequency band resources and the resource indication information in the frequency band resources.

In a second aspect, an embodiment of the present application provides a resource allocation device, which includes: at least one processor and at least one memory, the memory stores program codes, and the program codes, when executed by the processer, cause the processor to perform the process of:

for a logic channel corresponding to a sidelink communication service, a protocol layer responsible for resource allocation of a sidelink communication interface generates a candidate frequency band resource list corresponding to the logic channel; and the protocol layer allocates resources for the logic channel corresponding to the sidelink communication service from the candidate frequency band resource list.

In some embodiments, the protocol layer determines the candidate frequency band resource list corresponding to the logic channel according to one or a combination of: a correspondence between logical channels corresponding to the sidelink communication services and Sub-Carrier Spacings, SCSs; a correspondence between frequency band resources and the SCSs; capability information of a sidelink communication terminal; a correspondence, configured by a high layer, between the sidelink communication services and the frequency band resources.

In some embodiments, the correspondence between logical channels corresponding to the sidelink communication services and the SCSs is determined by the protocol layer based on: Quality of Service (QoS) parameters of logical channels corresponding to the sidelink communication services; or high-level configuration.

In some embodiments, the protocol layer allocates resources for the logic channel corresponding to the sidelink communication service from the candidate frequency band resource list according to: a data volume of the logical channel corresponding to the sidelink communication service; and/or a result of measuring, by a sidelink communication terminal, candidate frequency bands in the candidate frequency band resource list.

In some embodiments, in a resource allocation mode of network scheduling, the protocol layer is a Media Access Control, MAC, layer of a network-side device; or in a resource allocation mode of terminal self-selection, the protocol layer is an MAC layer of the sidelink communication terminal.

In some embodiments, the sidelink communication terminal receives the correspondence between the frequency band resources and the SCSs through broadcast or dedicated signaling; or the sidelink communication terminal obtains the correspondence between the frequency band resources and the SCSs through protocol agreement or pre-configuration.

In some embodiments, in the resource allocation mode of network scheduling, the MAC layer of the network-side device receives the auxiliary information for frequency band resource selection reported by the sidelink communication terminal; the auxiliary information includes one or a combination of: QoS parameters of the logical channels corresponding to the sidelink communication services; a data volume of the logical channel corresponding to the sidelink communication service; the capability information of the sidelink communication terminal; a candidate frequency band resource list suggested by the sidelink communication terminal; a result of measuring, by the sidelink communication terminal, on all frequency band resources or the suggested candidate frequency band resource list.

In some embodiments, in the resource allocation mode of network scheduling, the sidelink communication terminal receives a scheduling signaling for the sidelink communication interface sent by the network-side device; the scheduling signaling carries the indication information of one or more frequency band resources and the resource indication information in the frequency band resources.

In a third aspect, the present application further provides a non-transitory computer storage medium storing a computer program thereon, where the program implements the steps of the method described in the first aspect when executed by a processor.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

Figure 1:
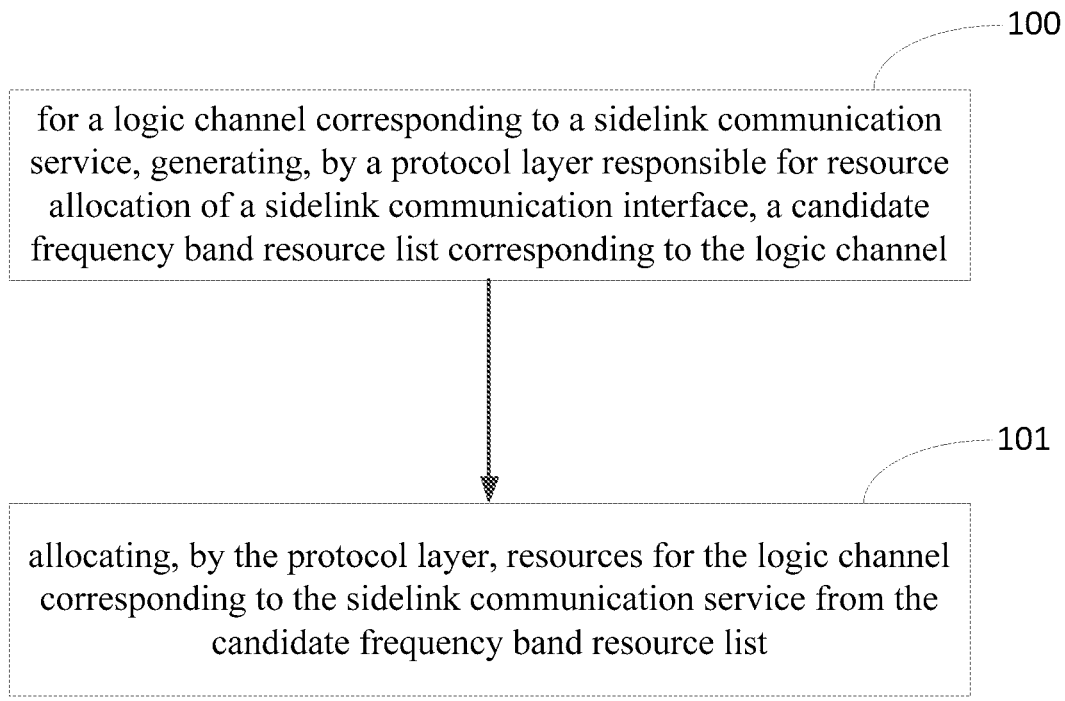
FIG. 1 is a schematic diagram of a resource allocation method, provided by an embodiment of the present application.

In order to make the purposes, technical solutions and advantages of the embodiments of the present application clearer, the embodiments of the present application will be further illustrated below in details with reference to the accompanying figures. Obviously the described embodiments are merely a part of the embodiments of the present application but not all the embodiments. Based upon the embodiments of the present application, all of other embodiments obtained by those ordinary skilled in the art without creative work pertain to the protection scope of the embodiments of the present application.

Some words that appear herein will be explained below:

(1) The term "a plurality of" in the embodiments of the present application refers to two or more, and other quantifiers are similar thereto.

(2) "and/or" describes the association relationship of the associated objects, and indicates that there may be three relationships, for example, A and/or B may represent: only A, both A and B, and only B. The character "/" generally indicates that the associated objects before and after the character have a kind of "or" relationship.

(3) "terminal" in the embodiments of the present application refers to a terminal that can support the method of selecting frequency band resources.

(4) "SCS" in the embodiment of the present application refers to subcarrier spacing.

(5) "frequency band" in the embodiments of the present application refers to a segment of specific frequency resources on the radio spectrum. A possible naming method in the 5G is to call it BWP (Band Width Part), and of course, other naming methods will not be ruled out in the future.

(6) "QoS" in the embodiments of the present application is Quality of Service.

(7) "MAC layer" in the embodiments of the present application is the media access control layer of the air interface protocol layer of the radio access network.

In the embodiments of the present application, when the resource allocation is performed, the candidate frequency band resource list corresponding to the logical channel corresponding to the sidelink communication service is generated by the protocol layer in the device; and the resources used are allocated by the protocol layer in the device to the logic channel corresponding to the sidelink communication service from the candidate frequency band resource list. That is, in the embodiments of the present application, the selection of frequency band resources is specifically executed on the MAC layer of the corresponding device. The executive subject, i.e., protocol layer, in the embodiments of the present application may be the protocol layer in the terminal or the protocol layer in the base station.

In some embodiments, when the uplink data transmission is performed, the sending device is a terminal and the receiving device is a base station; when the downlink data transmission is performed, the sending device is a base station and the receiving device is a terminal.

The resources in the foregoing method refer to specific time/frequency-domain resources or time/frequency/space-domain resources used by the logical channel corresponding to the sidelink communication service for data transmission.

The sidelink communication service can be but not limited to: V2X service, Device to Device, D2D, service, etc.

Embodiments of the present application will be further described in detail below in combination with the accompanying drawings of the specification.

As shown in FIG. 1, an embodiment of the present application provides a resource allocation method, which includes:

Step 100: for a logic channel corresponding to any sidelink communication service, a protocol layer responsible for resource allocation of a sidelink communication interface generates a candidate frequency band resource list corresponding to the logic channel;

Step 101: the protocol layer allocates resources on one or more frequency band resources for the logic channel corresponding to the sidelink communication service from the candidate frequency band resource list.

In the above method, the protocol layer responsible for resource allocation of the sidelink communication interface generates a candidate frequency band resource list corresponding to the logic channel; and then the protocol layer allocates resources for the logic channel corresponding to the sidelink communication service from the candidate frequency band resource list, and solving the problem of resource selection of the sidelink communication interface.

Here, in embodiments of the present application, different resource allocation modes are set for different cases, and two allocation modes are provided, which are a resource allocation mode of network scheduling and a resource allocation mode of terminal self-selection.

In the "resource allocation mode of network scheduling", it mainly means that the protocol layer in the network-side device generates a candidate resource list corresponding to the logical channel corresponding to the sidelink communication service, and sends the determined resources to the terminal that performs sidelink communication with the network-side device. After receiving the determined resources, the terminal sends data via the sidelink communication interface.

In the "resource allocation mode of terminal self-selection", it mainly means that the protocol layer in the terminal generates a candidate resource list corresponding to the logical channel corresponding to the sidelink communication service, and sends data via the sidelink communication interface according to resources determined by the protocol layer.

The two modes are introduced respectively below.

First resource allocation mode: resource allocation mode of network scheduling.

In some embodiments, in the resource allocation mode of network scheduling, the protocol layer refers to the MAC layer of the network-side device.

That is, when performing the resource allocation, the protocol layer responsible for the resource allocation generates a candidate frequency band resource list for the logical channel(s) corresponding to the sidelink communication service according to the auxiliary information, allocates resources for the logic channel(s) from the candidate frequency band resource list, and sends scheduling information containing indication information to the terminal; and the terminal determines the resources according to the indication information, and transmits data on the logic channel corresponding to the sidelink communication service through the determined resources.

Taking the V2X service as an example, the MAC layer performs the frequency band resource selection and generates a candidate frequency band resource list corresponding to the logical channel. Then the MAC layer determines the resources used for transmission of the V2X service via the sidelink communication interface according to the result of measuring, by the terminal, candidate frequency bands in the candidate frequency band resource list. In some embodiments, the protocol layer determines the candidate frequency band resource list corresponding to the logic channel corresponding to the sidelink communication service according to one or a combination of:

a correspondence between logical channels corresponding to sidelink communication services and SCSs;

a correspondence between frequency band resources and SCSs;

the capability information of the sidelink communication terminal;

a correspondence, configured by a high layer, between sidelink communication services and frequency band resources.

Here, with regarding to the correspondence between logical channels corresponding to sidelink communication services and SCSs, if the protocol layer wants to determine the candidate frequency band resource list corresponding to the logical channel corresponding to the sidelink communication service according to the correspondence between logical channels corresponding to sidelink communication services and SCSs, the protocol layer in the network-side device needs to determine the correspondence between logical channels corresponding to sidelink communication services and SCSs at first.

In some embodiments, the protocol layer determines the correspondence between logical channels corresponding to sidelink communication services and SCSs based on QoS parameters of the logical channels corresponding to the sidelink communication services; or the protocol layer determines the correspondence between logical channels corresponding to sidelink communication services and SCSs based on high-level configuration.

Here, the generating of a resource list in the candidate frequency band resource list corresponding to the logical channel may have numerous expression modes, for example, generating a resource list in the candidate frequency band resource list corresponding to the logical channel, generating a resource file in the candidate frequency band resource list corresponding to the logical channel, etc.

It should be noted that the above method of enumerating the resource list is just an example, and any method that can represent the resource list is applicable to the embodiments of the present application.

And, after the protocol layer generates the candidate frequency band resource list corresponding to the logical channel, there is a need to allocate resources for the logic channel corresponding to the sidelink communication service from the candidate frequency band resource list.

In some embodiments, the protocol layer allocates resources for the logic channel corresponding to the sidelink communication service from the candidate frequency band resource list according to the data volume of the logical channel corresponding to the sidelink communication service and/or the result of measuring, by the sidelink communication terminal, candidate frequency bands in the candidate frequency band resource list.

In some embodiments, in the resource allocation mode of network scheduling, after allocating resources for the logic channel corresponding to the sidelink communication service from the candidate frequency band resource list, the protocol layer informs the terminal of the determined resources by sending scheduling signaling for the sidelink communication interface to the terminal. The scheduling signaling carries the resource indication information to indicate to the terminal the resources used by the sidelink communication interface.

In the resource allocation mode of network scheduling, the sidelink communication terminal receives the scheduling signaling for the sidelink communication interface sent by the network-side device. The scheduling signaling carries the indication information of one or more frequency band resources and the resource indication information in the frequency band resources.

Here, the carrying mode of the frequency band resource indication information may be but not limited to: carrying in the PDSCH (Physical Downlink Shared Channel) scheduled by the SL-RNTI (Sidelink-Radio Network Temporary Identity) or SL-V2X-RNTI. The resource indication information includes the time/frequency resource indication information or time/frequency/space resource indication information. Then, the terminal determines the resources used by the logical channel corresponding to each sidelink communication service based on the received resource indication information of the sidelink communication interface.

Then, the terminal sends data via the sidelink communication interface by using the resources allocated for the logical channel corresponding to the sidelink communication service.

In order to better assist the protocol layer in the network-side device to generate the candidate frequency band resource list corresponding to the logical channel, the terminal performing the sidelink communication service through the logical channel with the network-side device will report auxiliary information to the network-side device.

In the resource allocation mode of network scheduling, the MAC layer receives the auxiliary information for frequency band resource selection reported by the sidelink communication terminal.

Here, the auxiliary information includes one or a combination of:

Information 1: QoS parameters of logical channels corresponding to the sidelink communication services;

Information 2: the data volume of the logical channel corresponding to the sidelink communication service;

Information 3: the capability information of the sidelink communication terminal;

Information 4: a candidate frequency band resource list suggested by the terminal;

Information 5: the result of measuring, by the terminal, on all frequency band resources or the suggested candidate frequency band resource list.

The above information will be introduced separately below:

(1) Information 1 is used by the protocol layer to determine the correspondence between logical channels corresponding to sidelink communication services and SCSs.

The QoS parameters of the logical channel corresponding to the sidelink communication service include but not limited to one or a combination of: PPPP (Per ProSe Packet Priority), PPPR (Per ProSe Packet Reliablity), PDB (Packet Delay Budget).

(2) Information 2 is used by the protocol layer to determine the resources allocated for the service according to the current data volume corresponding to the logical channel of the sidelink communication interface.

(3) Information 3 is used to allow the protocol layer responsible for resource allocation of a sidelink communication interface to determine which SCSs or which frequency band combinations are supported by the sidelink communication terminal through the capability information of the sidelink communication terminal. The capability information of the sidelink communication terminal includes but not limited to one or a combination of: frequency band combination, bandwidth, SCS, etc., supported by the terminal.

(4) Information 4 is used to better assist the protocol layer to generate the candidate frequency band resource list corresponding to the logical channel.

Here, the terminal may generate a candidate frequency band resource list according to the SCSs used by frequency band resources.

Based on this, if the terminal wants to send the auxiliary information including the candidate frequency band resource list suggested by the terminal to the network-side device, the terminal needs to determine the SCSs used by frequency band resources.

In some embodiments, the sidelink communication terminal receives a correspondence between frequency band resources and SCSs issued by the network-side device through broadcast or dedicated signaling; or the sidelink communication terminal obtains a correspondence between frequency band resources and SCSs through protocol agreement or pre-configuration.

That is, the terminal can receive the SCSs used by frequency band resources issued by the network-side device through broadcast (reusing the existing SIB (System Information Block) or introducing a new SIB) or dedicated signaling (including RRC (Radio Resource Control) signaling, MAC layer signaling or physical layer signaling), or agree by protocol or pre-configure the SCSs used by frequency band resources.

(5) Information 5 is mainly used to allow the protocol layer responsible for resource allocation of the sidelink communication interface to determine the resources used by the logical channel corresponding to the sidelink communication service in the transmission via the sidelink communication interface from the candidate frequency band resource list according to the result of measuring, by the terminal, on the all frequency band resources or the frequency band resources in the suggested candidate frequency band resources list.

The auxiliary information may select one or more of the foregoing information to be combined, so there may be various forms of auxiliary information for frequency band resource selection reported by the terminal to the MAC layer. A few are briefly listed below.

For example, the terminal may only choose to report the above information 4, i.e., the candidate frequency band resource list suggested by the terminal, to the MAC layer.

For another example, the terminal can choose to combine the above information 1 (the QoS parameters of the logical channels corresponding to the sidelink communication services) with the above information 3 (the ability information of the sidelink communication terminal) as the uploaded auxiliary information, the correspondence between logical channels corresponding to sidelink communication services and SCSs can be determined through the QoS parameters of the logical channels corresponding to the sidelink communication services, and further in combination with the capability information of the terminal, the candidate frequency band resource list can be determined.

Figure 2:
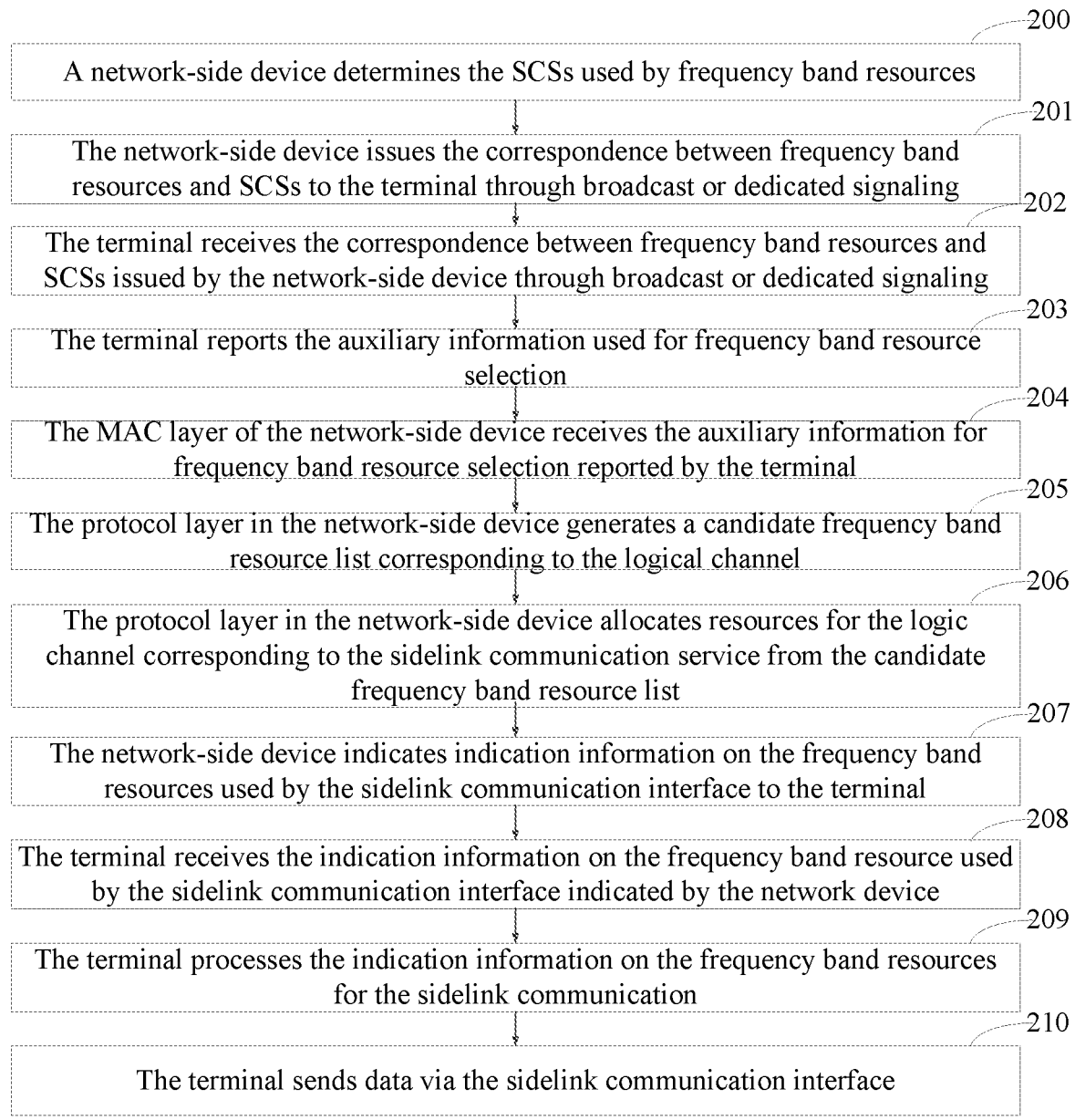
FIG. 2 is a schematic diagram of the overall flow in the resource allocation mode of network-side scheduling, provided by an embodiment of the present application.

The overall flow in the resource allocation mode of network side scheduling in embodiments of the present application will be briefly introduced below. The sidelink communication terminal selects the method of receiving the correspondence between frequency band resources and SCSs issued by the network-side device through broadcast or dedicated signaling. As shown in FIG. 2, the execution process is as follows:

Step 200: a network-side device determines the SCSs used by frequency band resources.

Step 201: the network-side device issues the correspondence between frequency band resources and SCSs to the terminal through broadcast or dedicated signaling.

Step 202: the terminal receives the correspondence between frequency band resources and SCSs issued by the network-side device through broadcast or dedicated signaling.

Step 203: the terminal reports the auxiliary information used for frequency band resource selection.

Step 204: the MAC layer of the network-side device receives the auxiliary information for frequency band resource selection reported by the terminal.

Step 205: the protocol layer in the network-side device generates a candidate frequency band resource list corresponding to the logical channel.

Step 206: the protocol layer in the network-side device allocates resources for the logic channel corresponding to the sidelink communication service from the candidate frequency band resource list.

Step 207: the network-side device indicates indication information on the frequency band resources used by the sidelink communication interface to the terminal.

Step 208: the terminal receives the indication information on the frequency band resources used by the sidelink communication interface indicated by the network device.

Step 209: the terminal processes the indication information on the frequency band resources for sidelink communication.

Step 210: the terminal sends data via the sidelink communication interface.

Second allocation mode: resource allocation mode of terminal self-selection.

In some embodiments, in the resource allocation mode of terminal self-selection, the protocol layer refers to an MAC layer of a sidelink communication terminal.

That is, when performing the resource allocation, the protocol layer responsible for the resource allocation generates a candidate frequency band resource list corresponding to the logical channel; allocates resources for the logic channel(s) corresponding to the sidelink communication service from the candidate frequency band resource list, and transmits the data on the logical channel(s) corresponding to the sidelink communication service through the allocated resources.

In some embodiments, the protocol layer determines the candidate frequency band resource list corresponding to the logic channel corresponding to the sidelink communication service according to one or a combination of:

a correspondence between logical channels corresponding to sidelink communication services and SCSs (Sub-Carrier Spacings);

a correspondence between frequency band resources and SCSs;

the capability information of the sidelink communication terminal;

a correspondence, configured by a high layer, between logical channels corresponding to sidelink communication services and frequency band resources.

Here, with regarding to the correspondence between logical channels corresponding to sidelink communication services and SCSs, if the protocol layer wants to determine the candidate frequency band resource list corresponding to the logical channel corresponding to the sidelink communication service according to the correspondence between logical channels corresponding to sidelink communication services and SCSs, the protocol layer in the sidelink communication terminal needs to determine the correspondence between sidelink communication services and SCSs at first.

In some embodiments, the protocol layer determines the correspondence between logical channels corresponding to sidelink communication services and SCSs based on QoS parameters of logical channels corresponding to sidelink communication services; or the protocol layer determines the correspondence between logical channels corresponding to sidelink communication services and SCSs through high-level configuration.

Here, the generating of a resource list in the candidate frequency band resource list corresponding to the logical channel may have numerous expression modes, for example, generating a resource list in the candidate frequency band resource list corresponding to the logical channel, generating a resource file in the candidate frequency band resource list corresponding to the logical channel, etc.

It should be noted that the above method of enumerating the resource list is just an example, and any method that can represent the resource list is applicable to the embodiments of the present application.

Here, the terminal may generate a candidate frequency band resource list according to the SCSs used by frequency band resources.

Based on this, the terminal can determine the SCSs used by frequency band resources in the following way.

In one embodiment, the sidelink communication terminal receives a correspondence between frequency band resources and SCSs issued by the network-side device through broadcast or dedicated signaling; that is, the terminal may receive the SCSs used by frequency band resources issued by the network-side device through broadcast (reusing the existing SIB or introducing a new SIB) or dedicated signaling (including RRC signaling, MAC layer signaling or physical layer signaling).

Correspondingly, the network-side device notifies the sidelink communication terminal of the correspondence between frequency band resources and SCSs through broadcast or dedicated signaling. Or, the sidelink communication terminal obtains a correspondence between frequency band resources and SCSs through protocol agreement or pre-configuration. After the candidate frequency band resource list corresponding to the logical channel is generated, there is a need to allocate resources for the logic channel corresponding to the sidelink communication service from the candidate frequency band resource list.

In some embodiments, the protocol layer allocates resources for the logic channel corresponding to the sidelink communication service from the candidate frequency band resource list according to the data volume of the logical channel corresponding to the sidelink communication service and/or the result of measuring, by the sidelink communication terminal, candidate frequency bands in the candidate frequency band resource list.

Then, the terminal sends data via the sidelink communication interface by using the allocated resources for the logical channel corresponding to the sidelink communication service.

Figure 3:
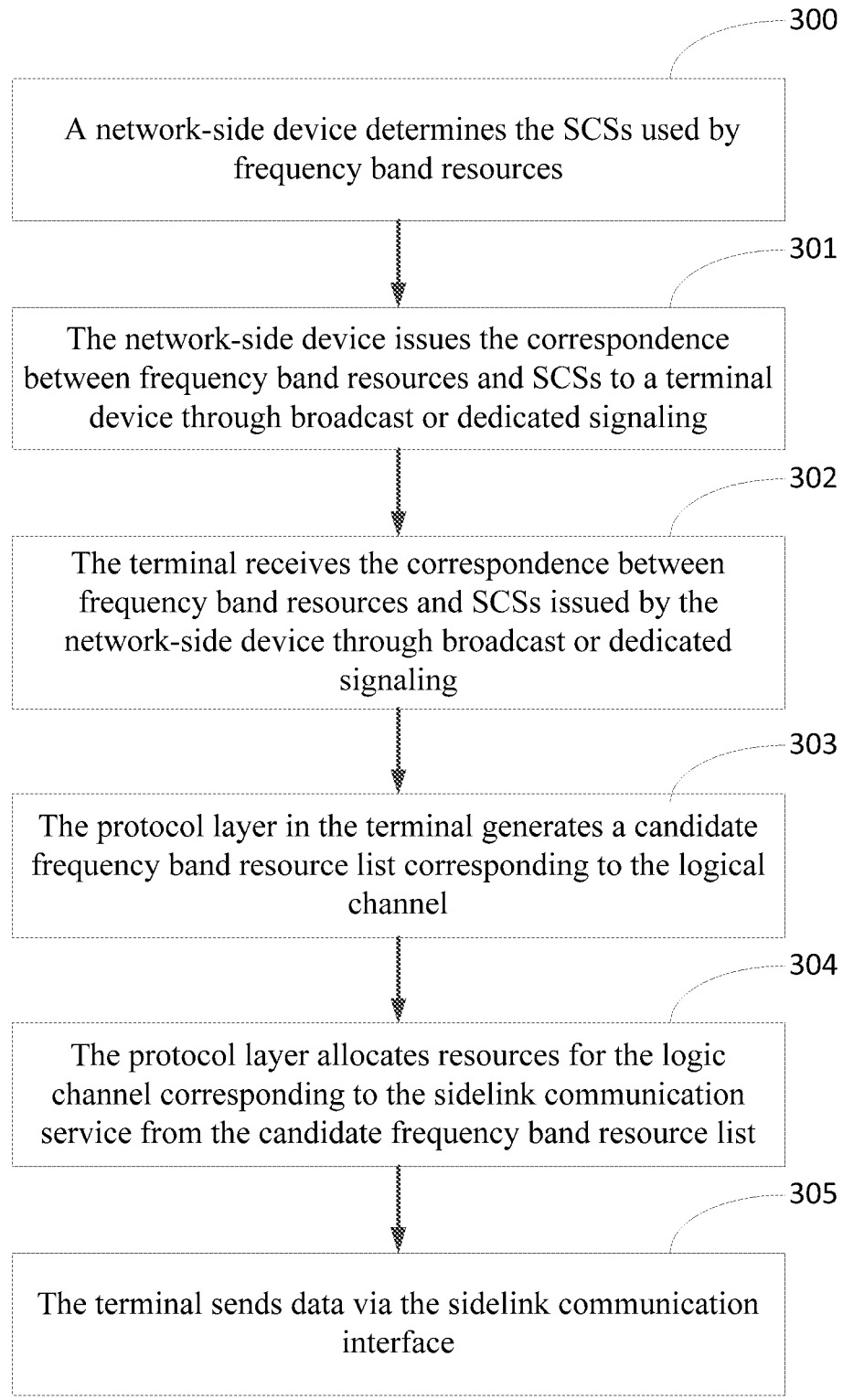
FIG. 3 is a schematic diagram of the overall flow in the resource allocation mode of terminal self-selection, provided by an embodiment of the present application.

The overall flow in the resource allocation mode of terminal self-selection in embodiments of the present application will be briefly introduced below. The sidelink communication terminal selects the method of receiving the correspondence between frequency band resources and SCSs issued by the network-side device through broadcast or dedicated signaling. As shown in FIG. 3, the specific execution process is as follows:

Step 300: a network-side device determines the SCSs used by frequency band resources.

Step 301: the network-side device issues the correspondence between frequency band resources and SCSs to a terminal device through broadcast or dedicated signaling.

Step 302: the terminal receives the correspondence between frequency band resources and SCSs issued by the network-side device through broadcast or dedicated signaling.

Step 303: the protocol layer in the terminal generates a candidate frequency band resource list corresponding to the logical channel.

Step 304: the protocol layer allocates resources for the logic channel corresponding to the sidelink communication service from the candidate frequency band resource list.

Step 305: the terminal sends data via the sidelink communication interface.

It should be noted that the methods listed above are just examples, and which method is specifically used can be set freely. In order to make the objects, technical solutions and advantages of the present application clearer, the present application will be further illustrated below in details with reference to the accompanying figures. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

The resource allocation method in embodiments of the present application will be further described in detail below with reference to the accompanying drawings of the specification, and the scenarios of resource allocation of the sidelink communication interface in the resource allocation mode of network scheduling and the resource allocation mode of terminal self-selection are respectively selected for illustration.

First embodiment: the resource allocation mode of network scheduling.

Figure 4:
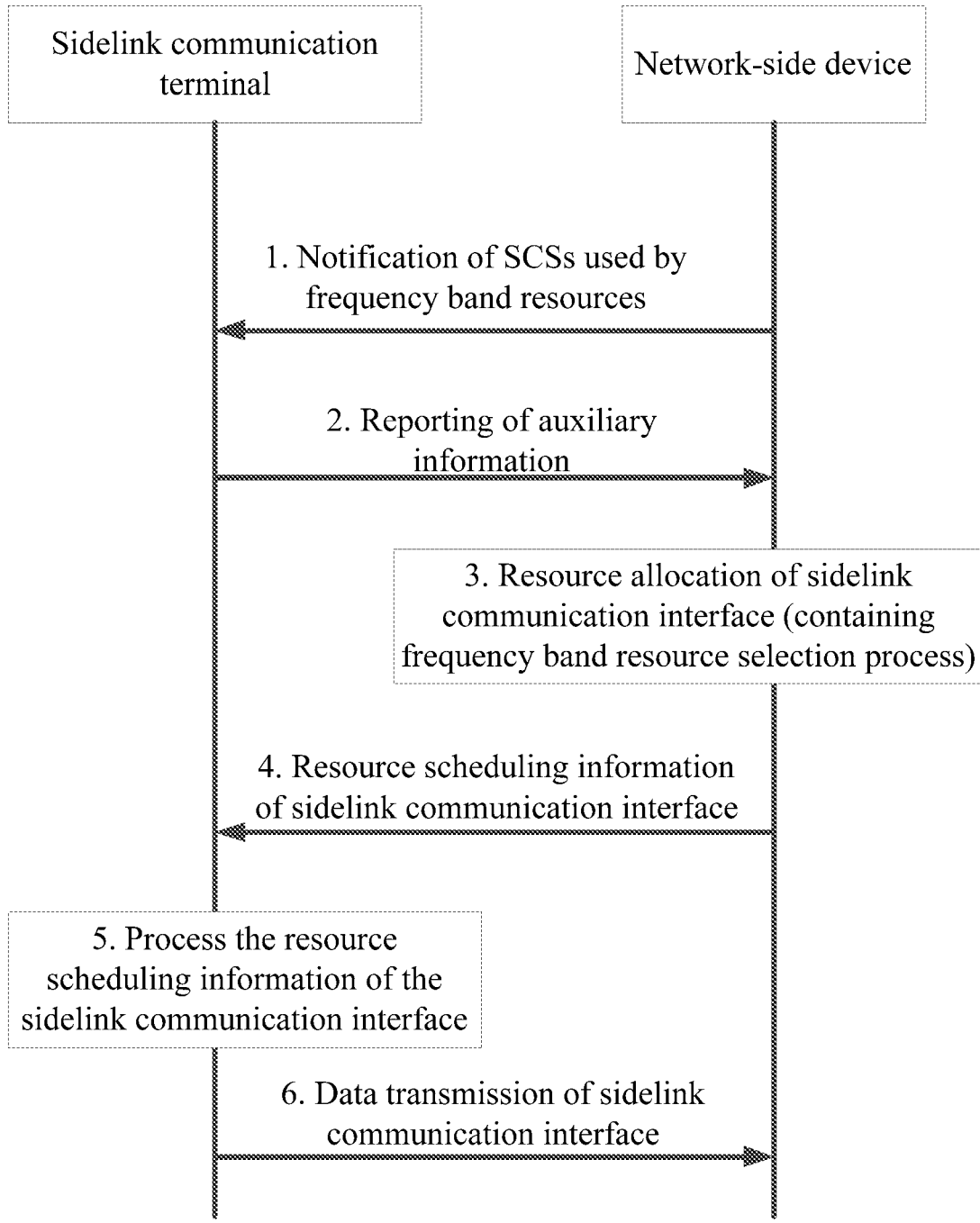
FIG. 4 is a schematic diagram of a resource allocation process of the sidelink communication interface in the resource allocation mode of network scheduling, provided by an embodiment of the present application.

Here, a schematic diagram of the resource allocation process of the sidelink communication interface in the resource allocation mode of network scheduling is as shown in FIG. 4, and the description of steps is as follows.

Step 1: the network-side device determines the notification of the SCSs used by frequency band resources.

Here, there are two ways to determine the notification of the SCSs used by frequency band resources on each frequency band, which are as follows.

In a first determining way: determine the SCSs used by frequency band resources based on network implementation.

In a second determining way: agree by protocol or pre-configure the SCSs used by frequency band resources.

For the first determining way, the network device needs to notify the terminal of the SCSs used by frequency band resources through broadcast (reusing the existing SIB or introducing a new SIB) or dedicated signaling (including RRC signaling, MAC layer signaling or physical layer signaling).

For the second determining way, the notification process can be omitted. Therefore the step 1 is an optional step.

Step 2: the terminal reports the auxiliary information to the network-side device.

Here, the terminal reports the auxiliary information to the network-side device, which is beneficial to assist the MAC layer of the network device to perform the frequency band resource selection and generate a list of candidate frequency band resources.

The content of the auxiliary information can be but not limited to one or a combination of:

a) QoS parameters of the logical channels corresponding to the sidelink communication services.

Here, the QoS parameters of the logical channel corresponding to the sidelink communication service include but not limited to one or a combination of: PPPP, PPPR, delay parameter, etc.

b) The information on the logical channel corresponding to the sidelink communication service.

Here, the information on the logical channel corresponding to the sidelink communication service may be service representation, service data volume, and so on.

c) The capability information of the sidelink communication terminal.

Here, the capability information of the sidelink communication terminal includes but not limited to one or a combination of: frequency band combination, bandwidth, SCS, etc., supported by the terminal.

d) A candidate frequency band resource list suggested by the terminal.

e) The result of measuring, by the terminal, on all frequency band resources or the candidate frequency band resource list.

f) The correspondence, configured by a high layer, between sidelink communication services and available frequency band resources.

Step 3: the network-side device performs the resource allocation of the sidelink communication interface according to the auxiliary information reported by the terminal.

The steps are as follows.

(1) Available Frequency Band Resource Selection.

This is an optional step. If there is a correspondence between logical channels corresponding to sidelink communication services and available frequency band resources, this step needs to be performed. Otherwise, this step is skipped.

Available frequency band resources are determined according to the correspondence between logical channels corresponding to sidelink communication services and available frequency band resources configured by the high layer or agreed by protocol (the high-level configuration comes from the auxiliary information reported by the terminal in the step 2 or is directly obtained by the network device through interaction with the ProSe related server).

(2) Frequency Band Resource Selection.

The MAC of the network device performs the frequency band resource selection and generates a candidate frequency band resource list.

In this step, the factors considered include but not limited to one or a combination of:

a correspondence between logical channels corresponding to sidelink communication services and SCSs;

the capability information of the sidelink communication terminal.

For example, if the sidelink communication terminal has the strong capability and can support all frequency bands, it only needs to determine the candidate frequency band resource list based on the correspondence between logical channels corresponding to sidelink communication services and SCSs. Otherwise, the capability information of the terminal also needs to be considered, for example, which SCSs or which frequency band combinations are supported by the terminal.

Here, the way to determining the correspondence between logical channels corresponding to sidelink communication services and SCSs may be but not limited to one of the following determining ways.

In a first determining way: determine the correspondence between V2X services and SCSs based on the QoS parameters of the V2X services, for example, PPPR or delay parameter, etc.

In a second determining way: the high layer configures the correspondence between V2X services and SCSs, the high layer refers to the non-access layer, such as ProSe-related protocol layer defined by SA2.

The MAC layer of the network device can determine which frequency band resources on the available frequency band determined in the step (1) can be used as the candidate frequency band resources of the logical channel corresponding to the sidelink communication service according to the correspondence between logical channels corresponding to sidelink communication services and SCSs as well as the correspondence between SCSs and frequency band resources.

The MAC layer determines the frequency band resources used by the logical channel corresponding to the sidelink communication service in the sidelink communication interface transmission according to the result of measuring, by the terminal, the frequency band resources in the candidate frequency band resource list.

(3) Resource Selection.

The network device further allocates resources for the logical channel corresponding to each sidelink communication service of the terminal from the selected frequency band resources, and determines the total resource allocation information for the sidelink communication terminal in comprehensive consideration of the resource allocation situation of logical channels corresponding to respective sidelink communication services of the sidelink communication terminal.

(4) The network device sends the resource scheduling information for the sidelink communication interface to the sidelink communication terminal.

The resource scheduling information carries the indication information of frequency band resources, specifically indicating the indication information of frequency band resources used by the sidelink communication interface to the terminal. The specific way to carry the indication information of frequency band resources may be but not limited to: carry the indication information of frequency band resources in the PDSCH scheduled by the SL-RNTI or SL-V2X-RNTI.

(5) The Sidelink Communication Terminal Processes the Resource Scheduling Information for the Sidelink Communication Interface.

The sidelink communication terminal determines the resources used by the logical channel corresponding to each sidelink communication service based on the received resource allocation information of the sidelink communication interface.

(6) Data Transmission Via the Sidelink Communication Interface.

Data is sent via the sidelink communication interface by using the resources determined in the step (5) for the logical channel corresponding to each sidelink communication service.

Second embodiment: resource allocation mode of terminal self-selection.

Figure 5:
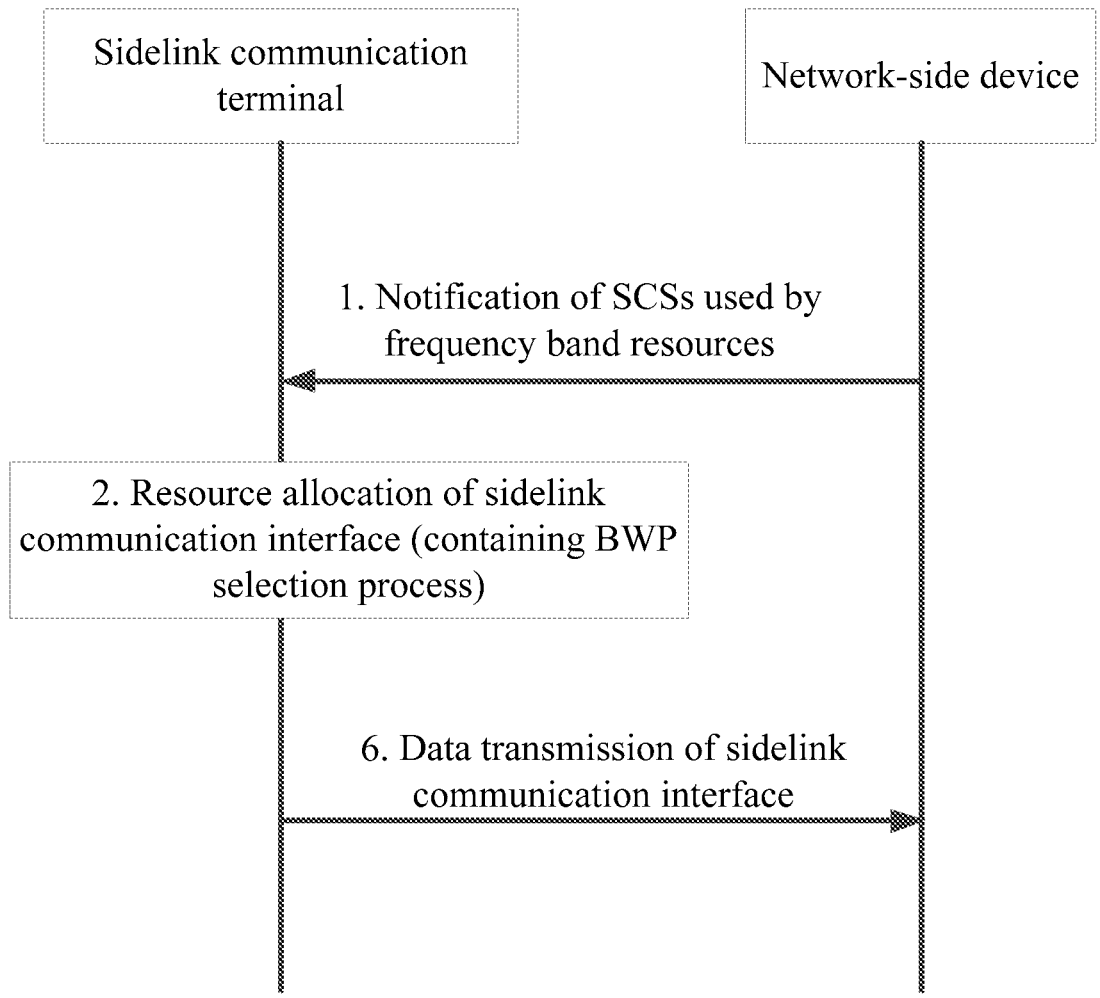
FIG. 5 is a schematic diagram of a resource allocation process of the sidelink communication interface in the resource allocation mode of terminal self-selection, provided by an embodiment of the present application.

Here, a schematic diagram of the resource allocation process of the sidelink communication interface in the resource allocation mode of terminal self-selection is as shown in FIG. 5, and the description of steps is as follows.

Step 1: the network-side device determines the notification of the SCSs used by frequency band resources.

Here, there are two ways to determine the SCSs used by frequency band resources on each frequency band, which are as follows.

In a first determining way: determine the SCSs used by frequency band resources based on network implementation.

In a second determining way: agree by protocol or pre-configure the SCSs used by frequency band resources.

For the first determining way, the network device needs to notify the terminal of the correspondence of frequency band resources/SCSs through broadcast (reusing the existing SIB or introducing a new SIB) or dedicated signaling (including RRC signaling, MAC layer signaling or physical layer signaling).

For the second determining way, the notification process can be omitted. Therefore the step 1 is an optional step.

Step 2: the terminal performs the resource allocation of the sidelink communication interface.

Here, the terminal performs the resource allocation of the sidelink communication interface for the logical channel corresponding to each sidelink communication service. The resource allocation steps are as follows.

(1) Available frequency band resource selection.

This is an optional step. If there is a correspondence between logical channels corresponding to sidelink communication services and available frequency band resources, this step needs to be performed. Otherwise, this step is skipped.

(2) Determine available frequency band resources according to the correspondence between logical channels corresponding to sidelink communication services and available frequency band resources configured by the high layer or agreed by protocol.

The MAC of the sidelink communication terminal performs the frequency band resource selection and generates a candidate frequency band resource list.

In this step, the factors considered include but not limited to one or a combination of: a correspondence between logical channels corresponding to sidelink communication services and SCSs; the capability information of the sidelink communication terminal.

For example, if the sidelink communication terminal has the strong capability and can support all frequency bands, it only needs to determine the candidate frequency band resource list based on the correspondence between logical channels corresponding to sidelink communication services and SCSs. Otherwise, the capability information of the terminal also needs to be considered, for example, which SCSs or which frequency band combinations are supported by the terminal.

Here, the way to determining the correspondence between logical channels corresponding to sidelink communication services and SCSs may be but not limited to one of the following determining ways.

In a first determining way: determine the correspondence between V2X services and SCSs based on the QoS parameters of the V2X services.

For example, the correspondence between V2X services and SCSs is determined based on the PPPR or delay parameter, etc.

In a second determining way: the high layer configures the correspondence between V2X services and SCSs, the high layer refers to the non-access layer, such as ProSe-related protocol layer defined by SA2.

The sidelink communication terminal can determine which frequency band resources on the available frequency band determined in the step (1) can be used as the candidate frequency band resources of the logical channel corresponding to the sidelink communication service according to the correspondence between logical channels corresponding to sidelink communication services and SCSs as well as the correspondence between SCSs and frequency band resources.

The MAC layer determines the frequency band resources used by the logical channel corresponding to the sidelink communication service in the sidelink communication interface transmission according to the result of measuring, by the terminal, the frequency band resources in the candidate frequency band resource list.

(3) Resource Selection.

The sidelink communication terminal further allocates resources to the logical channel corresponding to each sidelink communication service of the terminal from the selected frequency band resources.

Step 3: Data transmission via the sidelink communication interface.

Data is sent via the sidelink communication interface by using the resources determined in the step 2 for the logical channel corresponding to each sidelink communication service.

In some embodiments, various aspects of the resource allocation provided in the embodiments of the present application can also be implemented in the form of a program product, which includes program codes. When the program product runs on a computer device, the program codes are configured to cause the computer device to perform the steps in the resource allocation method according to various exemplary embodiments of the present application described in this specification The program product can use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage media (non-exhaustive list) include: electrical connection with one or more wires, portable disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof The program product for the data forwarding control according to the embodiment of the present application may adopt a portable Compact Disk-Read Only Memory (CD-ROM) and include program codes, and may be run on a server device. However, the program product of the present application is not limited to this. In this document, the readable storage medium can be any tangible medium that contains or stores a program, where the program can be used by or used in combination with the information transmission apparatus or device.

The readable signal medium may include data signals propagated in the baseband or as a part of carrier waves, and the readable program codes are beared therein. Such propagated data signals can be in many forms, including but not limited to electromagnetic signals, optical signals, or any suitable combination thereof. The readable signal medium may also be any readable medium other than the readable storage medium, and the readable medium may send, propagate or transmit the programs used by or used in combination with the periodic network action system, apparatus or device.

The program codes contained on the readable medium can be transmitted by any suitable medium, including but not limited to wireless, wired, optical cable, RF, etc., or any suitable combination thereof The program codes for performing the operations of the present application can be compiled in any combination of one or more programming languages, where the programming languages include the object-oriented programming languages such as Java, C++, etc., and also include the conventional procedural programming languages such as "C" language or similar programming languages. The program codes can be executed entirely on a user computing device, executed partly on a user computing device, executed as an independent software package, executed partly on a user computing device and partly on a remote computing device, or executed entirely on a remote computing device or server. In the case of a remote computing device, the remote computing device can be connected to the user computing device through any kind of network including Local Area Network (LAN) or Wide Area Network (WAN), or can be connected to an external computing device.

Figure 6:
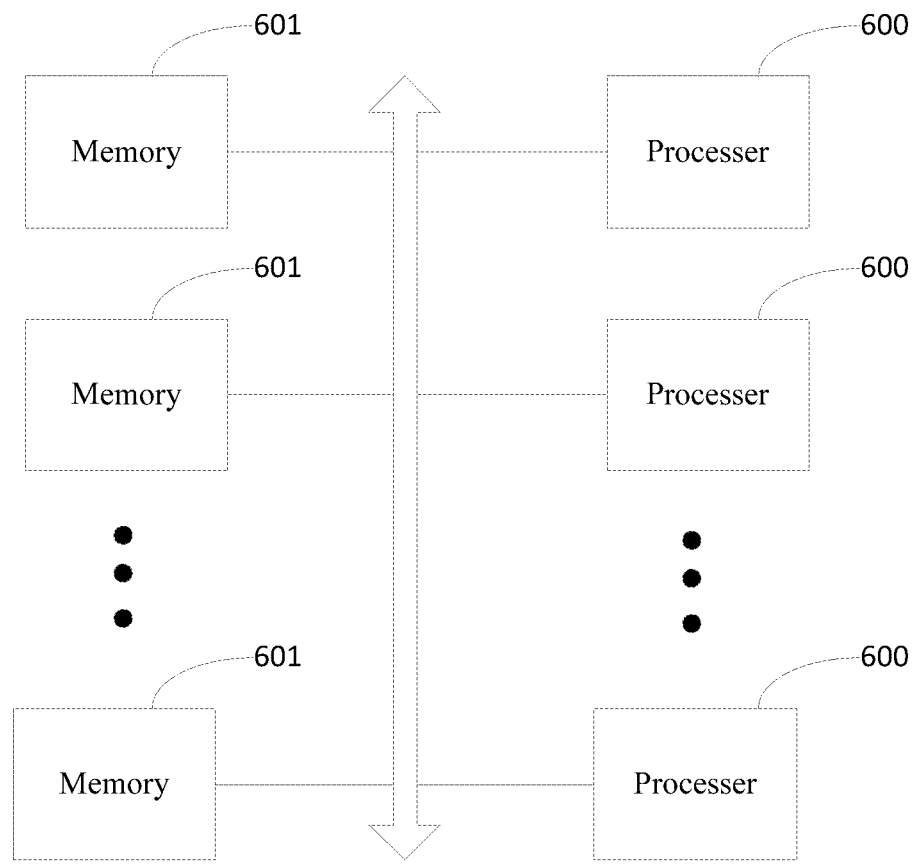
FIG. 6 is a schematic structural diagram of a first resource allocation device, provided by an embodiment of the present application.

As shown in FIG. 6, embodiment of the present application provides a resource allocation device, which includes: at least one processor 600 and at least one memory 601, the memory 601 stores program codes, and the program codes, when executed by the processor 600, cause the processor 600 to perform the process of:

for a logic channel corresponding to a sidelink communication service, a protocol layer responsible for resource allocation of a sidelink communication interface generates a candidate frequency band resource list corresponding to the logic channel; and the protocol layer allocates resources for the logic channel corresponding to the sidelink communication service from the candidate frequency band resource list.

In some embodiments, the processor 600 is configured to perform the process of:

determine, by the protocol layer, the candidate frequency band resource list corresponding to the logic channel corresponding to the sidelink communication service according to one or a combination of: a correspondence between logical channels corresponding to the sidelink communication services and Sub-Carrier Spacings, SCSs; a correspondence between a frequency band resources and the SCSs; capability information of a sidelink communication terminal; a correspondence, configured by a high layer, between the sidelink communication services and the frequency band resources.

In some embodiments, the correspondence between logical channels corresponding to the sidelink communication services and the SCSs is determined by the protocol layer based on:

Quality of Service, QoS, parameters of the logical channels corresponding to the sidelink communication services; or high-level configuration.

In some embodiments, the processor 600 is configured to perform the process of:

allocate, by the protocol layer, the resources for the logic channel corresponding to the sidelink communication service from the candidate frequency band resource list according to: a data volume of the logical channel corresponding to the sidelink communication service and/or a result of measuring, by sidelink communication terminal, candidate frequency bands in the candidate frequency band resource list.

In some embodiments, in the resource allocation mode of network scheduling, the device for frequency band resource selection is a network-side device, and the protocol layer is an MAC layer of the network-side device; or in a resource allocation mode of terminal self-selection, the device for frequency band resource selection is a sidelink communication terminal, and the protocol layer is an MAC layer of the sidelink communication terminal.

In some embodiments, before the generating, by the protocol layer responsible for resource allocation of the sidelink communication interface, the candidate frequency band resource list corresponding to the logic channel, the processor 600 is further configured to perform the process of:

receive, by the sidelink communication terminal, the correspondence between the frequency band resources and the SCSs through broadcast or dedicated signaling from the network-side device; or obtain, by the sidelink communication terminal, the correspondence between the frequency band resources and the SCSs through protocol agreement or pre-configuration.

In some embodiments, the processor 600 is configured to perform the process of:

in the resource allocation mode of network scheduling, receive, by the MAC layer of the network-side device, auxiliary information for frequency band resource selection reported by the sidelink communication terminal; the auxiliary information comprises one or a combination of: QoS parameters of the logical channels corresponding to the sidelink communication services; a data volume of the logical channel corresponding to the sidelink communication service; the capability information of the sidelink communication terminal; a candidate frequency band resource list suggested by the sidelink communication terminal; a result of measuring, by the sidelink communication terminal, on all frequency band resources or the suggested candidate frequency band resource list.

In some embodiments, the processor 600 is configured to perform the process of:

in the resource allocation mode of network scheduling, receive, by the sidelink communication terminal, a scheduling signaling for a sidelink communication interface sent by the network-side device;

the scheduling signaling carries indication information of one or more frequency band resources and resource indication information in the frequency band resources.

Figure 7:
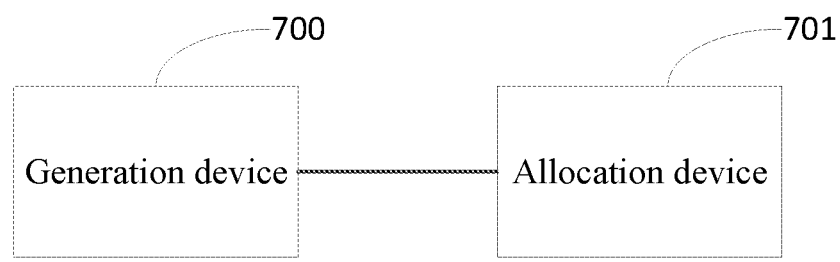
FIG. 7 is a schematic structural diagram of a second resource allocation device, provided by an embodiment of the present application.

As shown in FIG. 7, embodiment of the present application provides a resource selection device, including a generation device 700 and an allocation device 701:

the generation device 700 is configured to: for a logic channel corresponding to any sidelink communication service, generate, by a protocol layer responsible for resource allocation of a sidelink communication interface, a candidate frequency band resource list corresponding to the logic channel;

the allocation device 701 is configured to: allocate, by the protocol layer, resources for the logic channel corresponding to the sidelink communication service from the candidate frequency band resource list.

In some embodiments, the generation device 700 is configured to:

determine, by the protocol layer, the candidate frequency band resource list corresponding to the logic channel corresponding to the sidelink communication service according to one or a combination of: a correspondence between logical channels corresponding to sidelink communication services and SCSs; a correspondence between a frequency band resources and the SCSs; capability information of a sidelink communication terminal; a correspondence, configured by a high layer, between sidelink communication services and the frequency band resources.

In some embodiments, the correspondence between logical channels corresponding to the sidelink communication services and the SCSs is determined by the protocol layer based on:

Quality of Service, QoS, parameters of the logical channels corresponding to the sidelink communication services; or high-level configuration.

In some embodiments, the allocation device 701 is configured to:

allocate, by the protocol layer, the resources for the logic channel corresponding to the sidelink communication service from the candidate frequency band resource list according to the data volume of the logical channel corresponding to the sidelink communication service and/or a result of measuring, by a sidelink communication terminal, candidate frequency bands in the candidate frequency band resource list.

In some embodiments, in the resource allocation mode of network scheduling, the device for frequency band resource selection is a network-side device, and the protocol layer is an MAC layer of the network-side device; or in a resource allocation mode of terminal self-selection, the device for frequency band resource selection is a sidelink communication terminal, and the protocol layer is an MAC layer of the sidelink communication terminal.

In some embodiments, before the generating, by the protocol layer responsible for resource allocation of the sidelink communication interface, the candidate frequency band resource list corresponding to the logic channel, and the generation device 700 is further configured to:

receive, by the sidelink communication terminal, the correspondence between the frequency band resources and the SCSs through broadcast or dedicated signaling from the network-side device; or obtain, by the sidelink communication terminal, the correspondence between the frequency band resources and the SCSs through protocol agreement or pre-configuration.

In some embodiments, the generation device 700 is further configured to:

in the resource allocation mode of network scheduling, receive, by the MAC layer of the network-side device, auxiliary information for frequency band resource selection reported by the sidelink communication terminal; the auxiliary information comprises one or a combination of: QoS parameters of the logical channels corresponding to the sidelink communication services; a data volume of the logical channel corresponding to the sidelink communication service; the capability information of the sidelink communication terminal; a candidate frequency band resource list suggested by the sidelink communication terminal; a result of measuring, by the sidelink communication terminal, on all frequency band resources or the suggested candidate frequency band resource list.

In some embodiments, the generation device 700 is further configured to:

in the resource allocation mode of network scheduling, receive, by the sidelink communication terminal, a scheduling signaling for the sidelink communication interface sent by the network-side device;

the scheduling signaling carries indication information of one or more frequency band resources and resource indication information in the frequency band resources.

An embodiment of the present application further provides a non-transitory readable storage medium including program codes. When the program codes run on a computing device, the program codes are configured to cause the computing device to perform the steps of the resource allocation method.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A resource allocation method, comprising:
   for a logic channel corresponding to a sidelink communication service, generating, by a protocol layer responsible for resource allocation of a sidelink communication interface, a candidate frequency band resource list corresponding to the logic channel; and
   allocating, by the protocol layer, resources for the logic channel corresponding to the sidelink communication service from the candidate frequency band resource list;
   wherein the generating, by the protocol layer responsible for resource allocation of the sidelink communication interface, the candidate frequency band resource list corresponding to the logic channel, comprises:
   determining, by the protocol layer, the candidate frequency band resource list corresponding to the logic channel corresponding to the sidelink communication service according to one or a combination of:
   a correspondence between logical channels corresponding to the sidelink communication services and Sub-Carrier Spacings, SCSs;

a correspondence between frequency band resources and the SCSs;

capability information of a sidelink communication terminal;

a correspondence, configured by a high layer, between the sidelink communication services and the frequency band resources.

2. The method of claim 1, wherein the correspondence between logical channels corresponding to the sidelink communication services and the SCSs is determined by the protocol layer based on:

Quality of Service, QoS, parameters of the logical channels corresponding to the sidelink communication services; or high-level configuration.

3. The method of claim 1, wherein the allocating, by the protocol layer, resources for the logic channel corresponding to the sidelink communication service from the candidate frequency band resource list, comprises:

allocating, by the protocol layer, the resources for the logic channel corresponding to the sidelink communication service from the candidate frequency band resource list according to:

a data volume of the logical channel corresponding to the sidelink communication service.

4. The method of claim 1, wherein:

in a resource allocation mode of network scheduling, the protocol layer is a Media Access Control, MAC, layer of a network-side device; or in a resource allocation mode of terminal self-selection, the protocol layer is an MAC layer of the sidelink communication terminal.

5. The method of claim 4, wherein before the generating, by the protocol layer responsible for resource allocation of the sidelink communication interface, the candidate frequency band resource list corresponding to the logic channel, the method further comprises:

receiving, by the sidelink communication terminal, the correspondence between the frequency band resources and the SCSs through broadcast or dedicated signaling from the network-side device; or obtaining, by the sidelink communication terminal, the correspondence between the frequency band resources and the SCSs through protocol agreement or pre-configuration.

6. The method of claim 4, wherein before the generating, by the protocol layer responsible for resource allocation of the sidelink communication interface, the candidate frequency band resource list corresponding to the logic channel, the method further comprises:

in the resource allocation mode of network scheduling, receiving, by the MAC layer of the network-side device, auxiliary information for frequency band resource selection reported by the sidelink communication terminal;

wherein the auxiliary information comprises one or a combination of:

QOS parameters of the logical channels corresponding to the sidelink communication services;

a data volume of the logical channel corresponding to the sidelink communication service;

the capability information of the sidelink communication terminal;

a candidate frequency band resource list suggested by the sidelink communication terminal;

a result of measuring, by the sidelink communication terminal, on all frequency band resources or the suggested candidate frequency band resource list.

7. The method of claim 4, wherein before the generating, by the protocol layer responsible for resource allocation of the sidelink communication interface, the candidate frequency band resource list corresponding to the logic channel, the method further comprises:

in the resource allocation mode of network scheduling, receiving, by the sidelink communication terminal, a scheduling signaling for the sidelink communication interface sent by the network-side device;

wherein the scheduling signaling carries indication information of one or more frequency band resources and resource indication information in the frequency band resources.

8. A resource allocation device, comprising: at least one processor and at least one memory, wherein the memory stores program codes, and the program codes, when executed by the processor, cause the processor to perform the process of:

for a logic channel corresponding to a sidelink communication service, generating, by a protocol layer responsible for resource allocation of a sidelink communication interface, a candidate frequency band resource list corresponding to the logic channel; and allocating, by the protocol layer, resources for the logic channel corresponding to the sidelink communication service from the candidate frequency band resource list;

wherein the processor is configured to perform the process of:

determining, by the protocol layer, the candidate frequency band resource list corresponding to the logic channel corresponding to the sidelink communication service according to one or a combination of: a correspondence between logical channels corresponding to the sidelink communication services and Sub-Carrier Spacings, SCSs; a correspondence between a frequency band resources and the SCSs; capability information of a sidelink communication terminal; a correspondence, configured by a high layer, between the sidelink communication services and the frequency band resources.

9. The method of claim 1, wherein the allocating, by the protocol layer, resources for the logic channel corresponding to the sidelink communication service from the candidate frequency band resource list, comprises:

allocating, by the protocol layer, the resources for the logic channel corresponding to the sidelink communication service from the candidate frequency band resource list according to:

a result of measuring, by a sidelink communication terminal, candidate frequency bands in the candidate frequency band resource list.

10. The method of claim 1, wherein the allocating, by the protocol layer, resources for the logic channel corresponding to the sidelink communication service from the candidate frequency band resource list, comprises:

allocating, by the protocol layer, the resources for the logic channel corresponding to the sidelink communication service from the candidate frequency band resource list according to:

a data volume of the logical channel corresponding to the sidelink communication service; and a result of measuring, by a sidelink communication terminal, candidate frequency bands in the candidate frequency band resource list.

11. A non-transitory computer storage medium storing a computer program thereon, wherein the program, when executed by a processor, implements the method of claim 1.

12. The device of claim 8, wherein the correspondence between logical channels corresponding to the sidelink communication services and the SCSs is determined by the protocol layer based on:
  Quality of Service, QoS, parameters of the logical channels corresponding to the sidelink communication services; or
  high-level configuration.

13. The device of claim 8, wherein the processer is configured to perform the process of:
  allocating, by the protocol layer, the resources for the logic channel corresponding to the sidelink communication service from the candidate frequency band resource list according to a data volume of the logical channel corresponding to the sidelink communication service and/or a result of measuring, by a sidelink communication terminal, candidate frequency bands in the candidate frequency band resource list.

14. The device of claim 8, wherein:
  in a resource allocation mode of network scheduling, the protocol layer is a Media Access Control, MAC, layer of a network-side device; or
  in a resource allocation mode of terminal self-selection, the protocol layer is an MAC layer of the sidelink communication terminal.

15. The device of claim 14, wherein before the generating, by the protocol layer responsible for resource allocation of the sidelink communication interface, the candidate frequency band resource list corresponding to the logic channel, the processer is configured to perform the process of:
  receiving, by the sidelink communication terminal, the correspondence between the frequency band resources and the SCSs through broadcast or dedicated signaling from the network-side device; or
  obtaining, by the sidelink communication terminal, the correspondence between the frequency band resources and the SCSs through protocol agreement or pre-configuration.

16. The device of claim 14, wherein the processer is configured to perform the process of:
  in the resource allocation mode of network scheduling, receiving, by the MAC layer of the network-side device, auxiliary information for frequency band resource selection reported by the sidelink communication terminal; wherein the auxiliary information comprises one or a combination of: QOS parameters of the logical channels corresponding to the sidelink communication services; a data volume of the logical channel corresponding to the sidelink communication service; the capability information of the sidelink communication terminal; a candidate frequency band resource list suggested by the sidelink communication terminal; a result of measuring, by the sidelink communication terminal, on all frequency band resources or the suggested candidate frequency band resource list.

17. The device of claim 14, wherein the processer is configured to perform the process of:
  in the resource allocation mode of network scheduling, receiving, by the sidelink communication terminal, a scheduling signaling for the sidelink communication interface sent by the network-side device;
  wherein the scheduling signaling carries indication information of one or more frequency band resources and resource indication information in the frequency band resources.

* * * * *